(No Model.) 2 Sheets—Sheet 1.
W. H. HARBECK.
FLASH LIGHT PHOTOGRAPHIC APPARATUS.
No. 441,158. Patented Nov. 25, 1890.
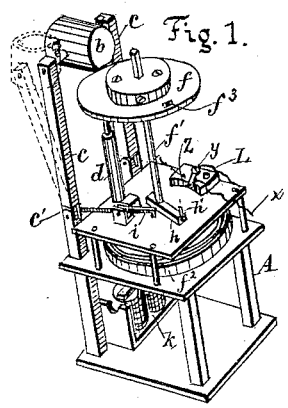
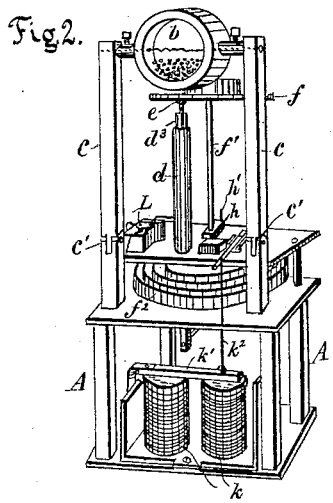
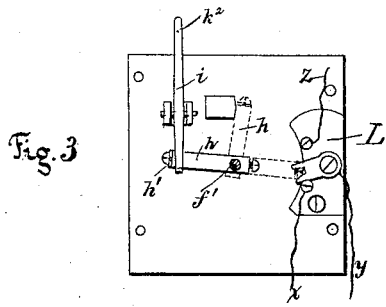
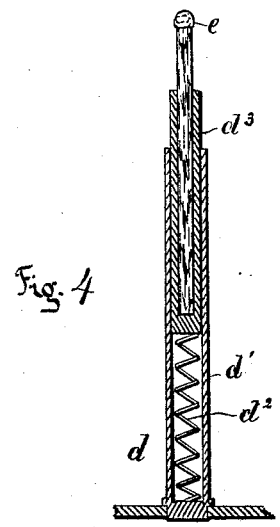
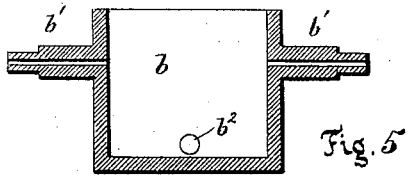
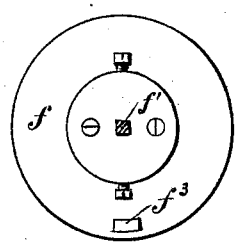
Witnesses:
L. G. Walker
J. M. Longnecker
Inventor:
William H. Harbeck
By Almon Hall
His Atty.

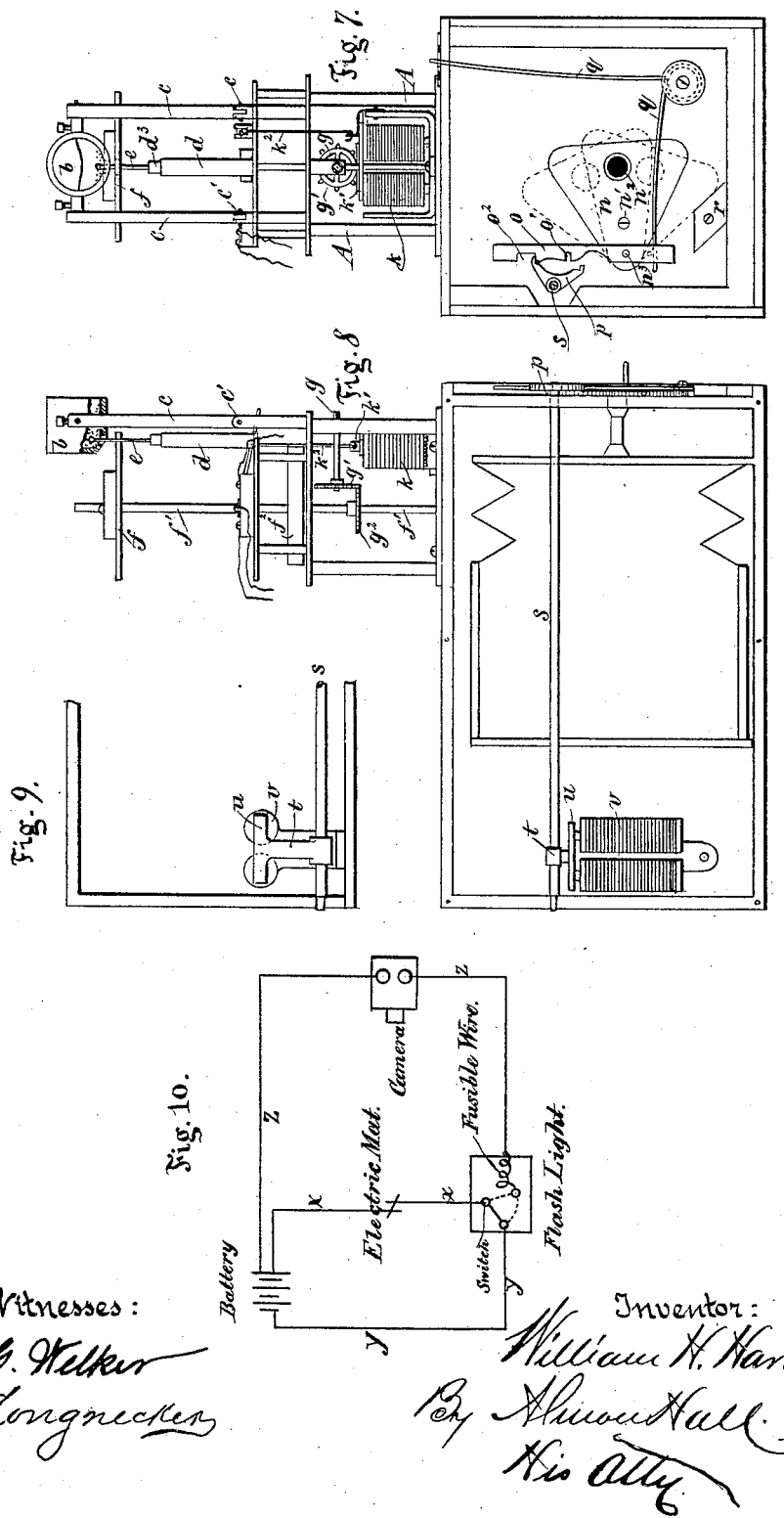

UNITED STATES PATENT OFFICE.

WILLIAM H. HARBECK, OF TOLEDO, OHIO.

FLASH-LIGHT PHOTOGRAPHIC APPARATUS.

SPECIFICATION forming part of Letters Patent No. 441,158, dated November 25, 1890.

Application filed April 30, 1890. Serial No. 350,109. (No model.)

*To all whom it may concern:*

Be it known that I, WILLIAM H. HARBECK, a citizen of the United States, residing at Toledo, Lucas county, Ohio, have invented certain new and useful Improvements in Flash-Light Photographic Apparatus, of which the following is a specification.

My invention relates to an electrically-controlled flash-light device, also an electrically-controlled camera, as well as the electrical connections which produce the simultaneous action of the flash-light and the camera.

Heretofore in devices of this character the chief difficulty has been to secure the exposure of the sensitized plate in the camera exactly in unison with the flash.

The object of my invention is to secure this result by means of a simple, cheap, and efficient apparatus, shown in the accompanying drawings, made part hereof, in which—

Figure 1 is a rear view of the flash-light mechanism of my device; Fig. 2, a front view of the same; Figs. 3, 4, 5, and 6, details of the same, hereinafter referred to; Fig. 7, a front view of my camera, showing the shutter, its construction, and operation with flash-light device in place on the camera; Fig. 8, a side view of the same seen from the left in Fig. 7; Fig. 9, a plan view of the interior of back part of camera, and Fig. 10 a diagram of electrical connections.

Like letters represent like parts in the several views.

The flash-light device shown in Figs. 1, 2, 7, and 8 is designed to be kept in a case or box, but for convenience is shown removed from its case.

A is a frame designed to support the various parts of the flash-light device. At the upper part of the frame is a swiveled powder-cup $b$, of brierwood, clay, or other suitable material, designed to receive the substance to be burned to produce the flash-light. The posts $c$ upon which $b$ swings are hinged or jointed at $c'$ to permit the cup to be swung forward out of its case or box for convenience in filling the cup and adjustment of the parts. The cup $b$ is suspended upon trunnions $b'$, which are pierced horizontally to receive a piece of fusible wire, as will be seen in the enlarged sectional view of the cup, Fig. 5. For the fusible wire I find that a bit of lightly-twisted tin-foil answers the purpose admirably. The cup has an opening $b^2$ through its side near the bottom in such position that when the cup is adjusted for operation this opening $b^2$ is at the under side of the cup. Immediately beneath the cup is a match-holder $d$, which consists of a vertical tube $d'$ containing a spiral spring $d^2$, which supports within the tube a sliding socket-piece $d^3$, designed to hold a common lucifer match $e$. (See Fig. 4.) The match $e$ has vertical motion in line with and can enter opening $b^2$ in the powder-cup. Between the powder-cup and the match is interposed the disk $f$, which rotates upon vertical shaft $f'$, which at its lower end engages a coiled spring $f^2$. The under side of disk $f$ has a roughened surface and is provided with an opening $f^3$, which at a point in its rotation coincides with the match $e$, so that the match being pressed upward by its supporting-spring against the rough lower side of the disk is ignited by contact with the rotating disk and then passes up through openings $f^3$ in the disk and $b^2$ in the powder-cup and ignites the flash-light powder contained in the cup. In setting the device for operation the spring $f^2$ may be wound up and the shaft $f'$ and disk $f$ rotated by means of a common clock-key placed on the end of shaft $g$, Figs. 7 and 8, on which is pinion $g'$, engaging pinion $g^2$, fixed on shaft $f$. Projecting radially from shaft $f'$ is an arm $h$, (see Fig. 3,) which when the device is set for operation is held in place by detent-lever $i$, which is disengaged from arm $h$ by the downward pull of electro-magnet $k$ upon armature $k'$ through cord $k^2$.

L is a switch adapted to be thrown by arm $h$ as it rotates with disk and shaft $f$ $f'$ by means of a projecting pin $h'$ on the arm which engages a notch in the end of the switch-arm $l$.

Camera $m$ is provided with shutter $n$, pivoted at $n'$, (see Fig. 7,) and having opening $n^2$ coinciding with the lens of the camera and being at $n^3$ pivoted to and actuated by vertically-sliding bar $o$. This bar is provided with notches $o'$ and $o^2$ in one of its edges, which notches are engaged in turn by tilting dog $p$. When the bar is depressed and the shutter raised, the lower arm of dog $p$ engages notch $o'$. When the dog is tilted, the bar is released and is pressed upwardly by spring $q$, but is caught and detained by the upper arm of the dog engaging notch $o^2$ at a point in the throw of the shutter where its opening coincides with the lens of the camera. When the dog is again tilted to its first position, the bar is released and completes its upward throw, completing the exposure by carrying the shutter down to its final position against stop $r$. Dog $p$ is fixed to one end of and is tilted by shaft $s$, which carries at its opposite extremity an arm $t$, to which is attached armature $u$, actuated by magnet $v$.

Magnet $k$ in the flash-light apparatus is in circuit $x\,y$. (See Fig. 10.) When the switch L is thrown by the release of arm $h$, magnet $k$ is thrown out of circuit, and the circuit now is through $z\,y$, including the camera-magnet, posts $c\,c$ in the flash-light device, and the fusible wire in cup $b$.

I find in practice that I am enabled by the adjustability of the powder-cup to throw the flash in the direction of the object to be photographed, and am thus enabled to obtain a stronger light and better results than when loose powder is flashed in the open air in the usual way.

The operation of my device is as follows: Circuit $x\,y$ is closed by means of an alarm-mat, a burglar-alarm, or other suitable circuit-closing device. Magnet $k$ pulls down armature $k'$ and cord $k^2$, tilting detent-lever $i$, which releases arm $h$. Coiled spring $f$ now rotates shaft $f'$, carrying with it friction-disk $f$, lighting match $e$, which is pressed against the disk by spring $d^2$ and which passes through opening $f$ in the disk and opening $b$ in the cup, igniting the flash-light powder in the cup. At the same instant arm $h$ throws switch-arm $i$, and the current is thus shunted through circuit $z\,y$, including the fusible wire in cup $b$ and the magnet $v$. The pull of magnet $v$ on arm and armature $t\,u$ through shaft $s$ tilts dog $p$, releasing shutter $n$ from its first position, permitting the shutter to fall, so that its opening coincides with the lens, the tilting-dog $n$ catching and holding the bar $o$ in this position by means of the continued pull of magnet $v$ on the dog through arm $t$, armature $u$, and shaft $s$. The fusible wire is now consumed by the heat of the flash-light, the circuit $z\,y$ is broken, magnet $v$ lets go, shutter $n$ falls, and the exposure is completed. Thus it will be seen that the exposure and the flash-light must be simultaneous and that the exposure is completed by the action of the flash itself.

What I claim as my invention, and desire to secure by Letters Patent, is—

1. In a photographic flash-light apparatus, a friction-plate, match, and match-holder, in combination with an electric circuit and magnet adapted to control such match and friction-plate, substantially as shown and described, for the purpose specified.

2. In a photographic flash-light apparatus, in combination with an electric circuit, a powder-cup adapted to receive the flash-light powder and permit the application of a lighted match thereto, and to receive a fusible wire in such electric circuit, whereby by the application of a lighted match the powder may be ignited and the wire burned off, substantially as shown and described, for the purpose described.

3. In a photographic flash-light apparatus, a powder receptacle adapted to permit the application of a match to its contents and to receive a fusible wire, in combination with an electrically-controlled friction-plate, match, and match-holder, substantially as shown and described, for the purpose specified.

4. In a photographic flash-light apparatus, an electric circuit adapted to control the flash-light and the camera, said circuit including a fusible wire adapted to be burned off by the flame of the flash-light, whereby the exposure is completed by the action of the flash-light, substantially as shown and described, for the purpose specified.

5. In a photographic flash-light apparatus, an electrically-controlled camera having in its controlling-circuit a fusible portion adapted and arranged to be burned off by the flash-light flame, substantially as shown and described, for the purpose specified.

6. In a photographic flash-light apparatus, an electrically-controlled flash-light device comprising in its construction a powder-receptacle, a friction-plate, a match and match-holder, and a fusible wire, in combination with an electrically-controlled camera in circuit with such fusible wire, and a suitable circuit-closer, substantially as shown and described, for the purpose specified.

7. In a photographic flash-light apparatus, the electric circuits $x\,y$ and $z\,y$, the former adapted to control the flash-light, the latter adapted to control the camera, in combination with the switch L, adapted to shunt the electric current from one of said circuits to the other, and a fusible wire in the latter circuit, substantially as shown and described, for the purpose specified.

8. In a photographic flash-light apparatus, an adjustable powder-cup adapted to throw the flash in the direction of the object to be photographed, substantially as shown and described, for the purpose specified.

WILLIAM H. HARBECK.

In presence of—
J. M. LONGNECKER,
H. S. HULL.